(12) United States Patent
Choi

(10) Patent No.: US 7,701,540 B2
(45) Date of Patent: Apr. 20, 2010

(54) LIQUID CRYSTAL DISPLAY DEVICE AND METHOD FOR MANUFACTURING THE SAME

(75) Inventor: Kee Seok Choi, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 422 days.

(21) Appl. No.: 11/479,428

(22) Filed: Jun. 29, 2006

(65) Prior Publication Data
US 2007/0070281 A1 Mar. 29, 2007

(30) Foreign Application Priority Data
Sep. 23, 2005 (KR) .................. 10-2005-0088778

(51) Int. Cl.
*G02F 1/1343* (2006.01)
*G02F 1/1339* (2006.01)
(52) U.S. Cl. ................. 349/141; 349/155; 349/156; 349/157
(58) Field of Classification Search ............. 349/141, 349/155–157
See application file for complete search history.

(56) References Cited

U.S. PATENT DOCUMENTS

| | | | |
|---|---|---|---|
| 6,437,847 B1 | 8/2002 | Kishimoto | |
| 6,678,031 B2 * | 1/2004 | Song | .................. 349/155 |
| 7,247,411 B2 * | 7/2007 | Song | .................. 430/7 |
| 7,385,666 B2 * | 6/2008 | Ashizawa et al. | .......... 349/156 |
| 2005/0088606 A1 | 4/2005 | Ashizawa et al. | |
| 2005/0140914 A1 | 6/2005 | Sawasaki et al. | |
| 2005/0185130 A1 * | 8/2005 | Oh et al. | .................. 349/156 |
| 2005/0190338 A1 | 9/2005 | Lim | |

(Continued)

FOREIGN PATENT DOCUMENTS

CN  1611996 A  10/2004

(Continued)

OTHER PUBLICATIONS

Combined Search and Examination Report date Oct. 31, 2006 corresponding to Great Britain Patent No. GB0612731.0.

(Continued)

*Primary Examiner*—Uyen-Chau N Le
*Assistant Examiner*—Rhonda S Peace
(74) *Attorney, Agent, or Firm*—Brinks Hofer Gilson & Lione

(57) ABSTRACT

A liquid crystal display device comprises first and second substrates that face each other, first and second lines formed on the first substrate in first and second directions that cross each other, respectively. The liquid crystal display device further comprises a protrusion formed at a predetermined portion on the first line, a first column spacer formed on the second substrate so as to correspond to the protrusion and having a corresponding surface with respect to the protrusion. The corresponding surface is wider than the protrusion. The liquid crystal display device also comprises a compensation pattern formed at another predetermined portion on the first line where the protrusion is not formed, and having a lower height than the protrusion, a second column spacer corresponding to the compensation pattern. The liquid crystal display device then comprises a liquid crystal layer between the first and second substrates. A method for manufacturing the LCD device is also disclosed.

39 Claims, 9 Drawing Sheets

U.S. PATENT DOCUMENTS

| | | | |
|---|---|---|---|
| 2006/0227271 A1* | 10/2006 | Park | 349/130 |
| 2007/0070286 A1* | 3/2007 | Cho et al. | 349/156 |
| 2007/0085967 A1* | 4/2007 | Park et al. | 349/156 |
| 2007/0139604 A1* | 6/2007 | Paik et al. | 349/156 |
| 2007/0153215 A1* | 7/2007 | Lee | 349/156 |

FOREIGN PATENT DOCUMENTS

| | | |
|---|---|---|
| DE | 10 2004 028 991 | 2/2005 |
| GB | 2411485 | 8/2006 |
| JP | 2001-183676 | 7/2001 |
| JP | 2005-242297 | 9/2005 |
| JP | 2005-242310 | 9/2005 |
| JP | 2006-201356 | 8/2006 |

OTHER PUBLICATIONS

Office Action issued in corresponding Notification of the First Office Action issued in corresponding Chinese Patent Application No. 2006100911043; issued Apr. 18, 2008.

Office Action issued in corresponding German Patent Application No. 10 2006 028 998.6; issued Dec. 5, 2008.

Office Action issued in corresponding Japanese Patent Application No. 2006-174761; Aug. 31, 2009.

* cited by examiner

LIQUID CRYSTAL DISPLAY DEVICE AND METHOD FOR MANUFACTURING THE SAME

This application claims the benefit of Korean Patent Application 10-2005-088778, filed on Sep. 23, 2005, which is hereby incorporated by reference.

FIELD

The present invention relates to a liquid crystal display device. More particularly, the present invention relates to a liquid crystal display device, which comprises a protrusion corresponding to a predetermined column spacer to reduce a contact area between the column spacer and an associated substrate facing each other in order to prevent a touch defect, and a compensation pattern corresponding to another column spacer to prevent, so called, a stamp spot (stamp defect) from being created at a specified portion by external force, such as pushing-down and the like, and a method for manufacturing the same.

BACKGROUND

Advances in information technology result in rapidly increasing demands for display devices having various shapes. Correspondingly, various flat panel display devices, such as liquid crystal display (LCD) devices, plasma display panels (PDPs), electro luminescent display (ELD) devices, vacuum fluorescent display (VFD) devices, and the like, have been continuously investigated, and some of them have been already applied to various apparatuses in practice.

Among these flat panel display devices, the LCD devices are most widely used for a mobile image display device in place of CRT monitors in view of their merits including excellent image quality, light weight, compactness, and low power consumption. Specifically, the LCD devices are developed for monitors of TV sets which can receive and display broadcasting signals, and monitors of computers in addition to mobile display devices such as notebook computers.

In order to allow the LCD devices to be applied to various apparatuses as a general screen display device, it is necessary for the LCD devices to realize high quality images such as high definition, high brightness, large size while maintaining merits such as light weight, compactness, and low power consumption.

Generally, the LCD device comprises a first substrate, a second substrate, a liquid crystal layer interposed between the first and second substrates which are assembled to each other with a predetermined space defined therebetween.

More specifically, the first substrate is formed with a plurality of gate lines arranged at uniform intervals in one direction, and a plurality of data lines arranged at uniform intervals in another direction perpendicular to the gate lines to define pixel regions. Each of the pixel regions has a pixel electrode formed therein, and a thin film transistor formed at a region where the respective gate lines and the data lines cross each other, and acting to transmit a data signal of the data lines to an associated pixel electrode according to a signal applied to the gate lines.

In addition, the second substrate is formed with a black matrix layer to shield light from a portion excluding the pixel regions, a color filter layer of R, G and B to exhibit color images, and a common electrode on the color filter layer to realize the images.

For such an LCD device, liquid crystals are arranged in the liquid crystal layer interposed between the first and second substrates by electric field generated between the pixel electrode and the common electrode such that an image is exhibited by adjusting an amount of light transmitting through the liquid crystal layer according to an orientation degree of the liquid crystal layer.

Such an LCD device is referred to as a twisted nematic (TN) mode LCD device. Since the TN mode LCD device has a disadvantage in terms of a narrow view angle, an in-plane switching (IPS) mode LCD device was developed to overcome the disadvantage of the TN mode LCD device.

For the IPS mode LCD device, the pixel electrode and the common electrode are formed, and parallelly separated a predetermined distance from each other on the pixel region of the first substrate to generate a horizontal electric field between the pixel electrode and the common electrode such that the liquid crystal layer is oriented by the electric field.

Meanwhile, the LCD device further comprises a spacer formed between the first and second substrate to maintain a constant separation therebetween where the liquid crystal layer is formed.

The spacer can be, classified into a ball spacer, and a column spacer according to the shapes thereof.

The ball spacers have a spherical shape, and are scattered on the first and second substrates. The ball spacers move relatively freely even after the first and second substrates are assembled, and have a small contact area with the first and second substrates.

On the other hand, the column spacer is formed by an array process on the first substrate or the second substrate, and is secured to one of the substrates in a column shape having a predetermined height. Accordingly, the column spacer has a higher contact area than that of the ball spacers.

A liquid crystal display device having a conventional column spacer will be described with reference to the drawings.

FIG. 1 is a cross-sectional view illustrating the liquid crystal display device having the column spacer.

Referring to FIG. 1, the LCD device having the column spacer comprises first and second substrates 30 and 40 facing each other, a column spacer 20 formed between the first and second substrates 30 and 40, and a liquid crystal layer (not shown) filled between the first and second substrates 30 and 40.

The first substrate 30 is formed thereon with gate lines 31 and data lines (not shown) vertically crossing each other to define pixel regions, each of which has a pixel electrode (not shown) formed therein, and thin film transistors (TFT) at respective regions where the gate lines 31 cross the data lines.

The second substrate 40 is formed thereon with a black matrix layer 41 at a region excluding the pixel regions, a color filter layer 42 of a stripe shape corresponding to the pixel regions on a longitudinal line horizontal to the data lines, and a common electrode or an overcoat layer 43 on the overall surface.

Here, the column spacer 20 is formed at a predetermined position above the gate lines 31.

In addition, the first substrate 30 is further formed with a gate insulation layer 36 over an entire upper surface including the gate lines 31, and a passivation layer 37 on the gate insulation layer 36.

FIGS. 2A and 2B are a plan view, and a cross-sectional view illustrating a touch defect on the liquid crystal display device comprising the column spacer.

As shown in FIGS. 2A and 2B, for the liquid crystal display device comprising the conventional column spacer described above, if an operator touches a surface of a liquid crystal panel 10 in a predetermined direction with a finger or other articles, a spot is formed on a touched portion. Since it is generated by touching the surface of the panel, the spot is called a touch spot, or since the spot is observed on a screen, it is also called a touch defect.

Such a touch defect is considered to be created due to a large frictional force resulting from a greater contact area between the column spacer 20 and the first substrate 1 facing each other in comparison with the structure employing the ball spacers. That is, since the column spacer 20 has a columnar shape, and has a great contact area with respect to the first substrate 1 compared with the ball spacers, as shown in FIG. 2B, it takes a longer period of time for the touched portion to recover an original state after shift of the first substrate 1 with respect to the second substrate 2 caused by touch on the surface, thereby allowing the spot to remain on the touched portion until the touched portion recovers the original state.

However, such a liquid crystal comprising the conventional column spacer has problems as follows.

First, since the contact area between the column spacer and the substrate facing each other is wide, causing a high frictional force, it takes a long period of time for the touched portion to recover the original state when one of the substrates are shifted with respect to the other due to the touch, thereby causing the spot to be observed while the touched portion is recovered to the original state.

Second, when the liquid crystal panel comprising the column spacer is brought into a high temperature condition in an upright state, liquid crystals suffer from thermal expansion. In severe cases, the cell gap expands thicker than a height of the column spacer, and causes the liquid crystals to flow down to a lower portion of the liquid crystal panel so that the lower portion of the liquid crystal panel bulges, and looks opaque.

SUMMARY

A liquid crystal display device comprises first and second substrates that face each other, first and second lines formed on the first substrate in first and second directions that cross each other, respectively. The liquid crystal display device further comprises a protrusion formed at a predetermined portion on the first line, a first column spacer formed on the second substrate so as to correspond to the protrusion and that has a corresponding surface with respect to the protrusion. The corresponding surface is wider than the protrusion. The liquid crystal display device also comprises a compensation pattern formed at another predetermined portion on the first line where the protrusion is not formed. The compensation pattern has a lower height than the protrusion. The liquid crystal display device then includes a second column spacer corresponding to the compensation pattern, and a liquid crystal layer formed between the first and second substrates.

In accordance with another aspect of the present invention, a method for manufacturing a liquid crystal display device comprises preparing first and second substrates, forming a first line on the first substrate in a first direction, sequentially depositing an insulation film, a semiconductor material layer, and a source/drain electrode material layer on the first substrate that comprises the first line. The method for manufacturing a liquid crystal display device further comprises applying a photosensitive film that has a first thickness to the source/drain electrode material layer, selectively patterning the photosensitive film to form a first photosensitive film pattern that has the first thickness and a second photosensitive film pattern that has a second thickness lower than the first thickness at predetermined portions on the first line, respectively. The method for manufacturing a liquid crystal display device also includes selectively etching the source/drain electrode material layer and the semiconductor material layer using the first and second photosensitive film patterns as a mask to form a protrusion at a portion corresponding to the first photosensitive film pattern, and a compensation pattern at a portion corresponding to the second photosensitive film pattern, respectively. The method for manufacturing a liquid crystal display device then comprises forming a first column spacer at a portion on the second substrate corresponding to the protrusion, and a second column spacer at a portion on the second substrate corresponding to the compensation pattern. The method for manufacturing a liquid crystal display device further comprises bonding the first and second substrates to each other, and forming a liquid crystal layer between the first and second substrates.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
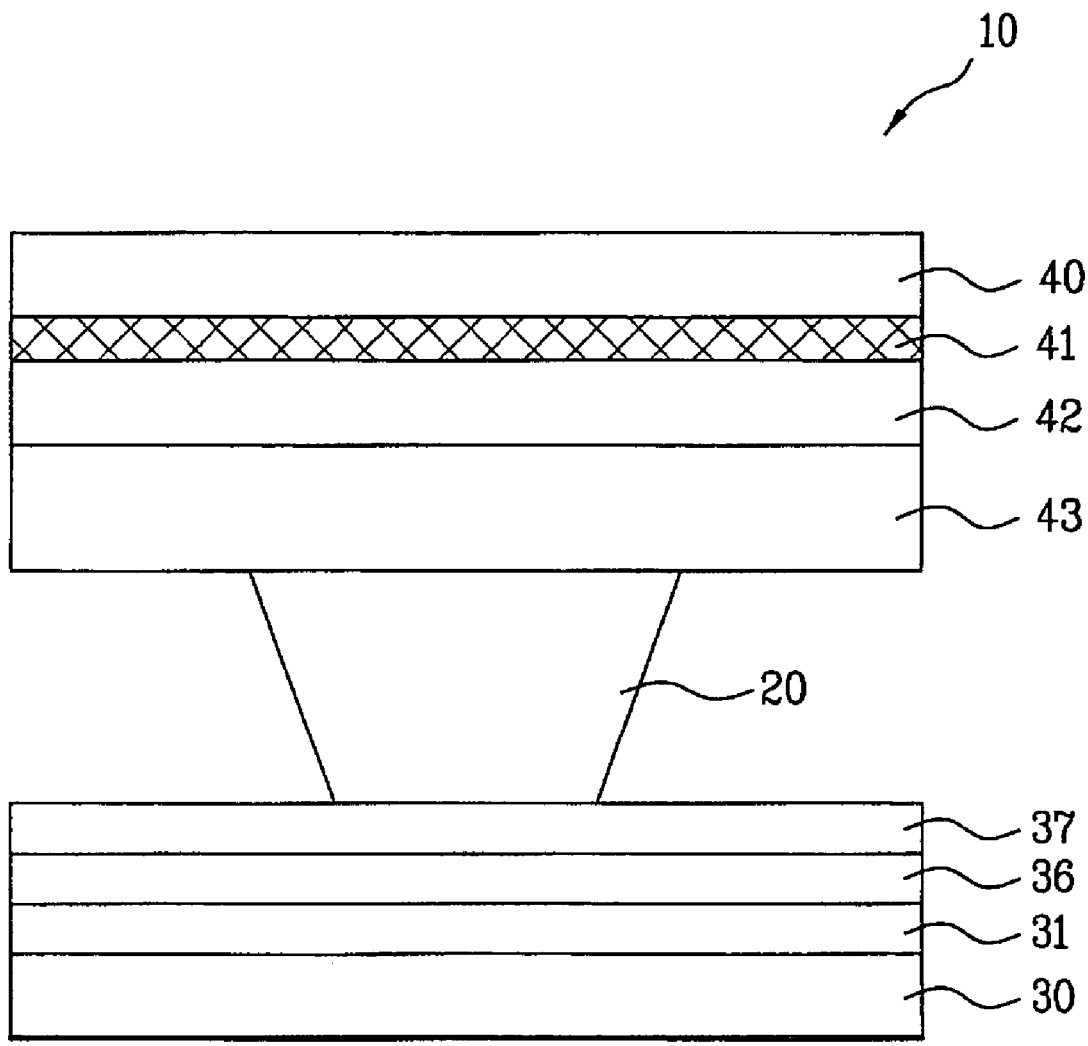
FIG. 1 is a cross-sectional view illustrating a conventional liquid crystal display device comprising a column spacer.
Figure 2A:
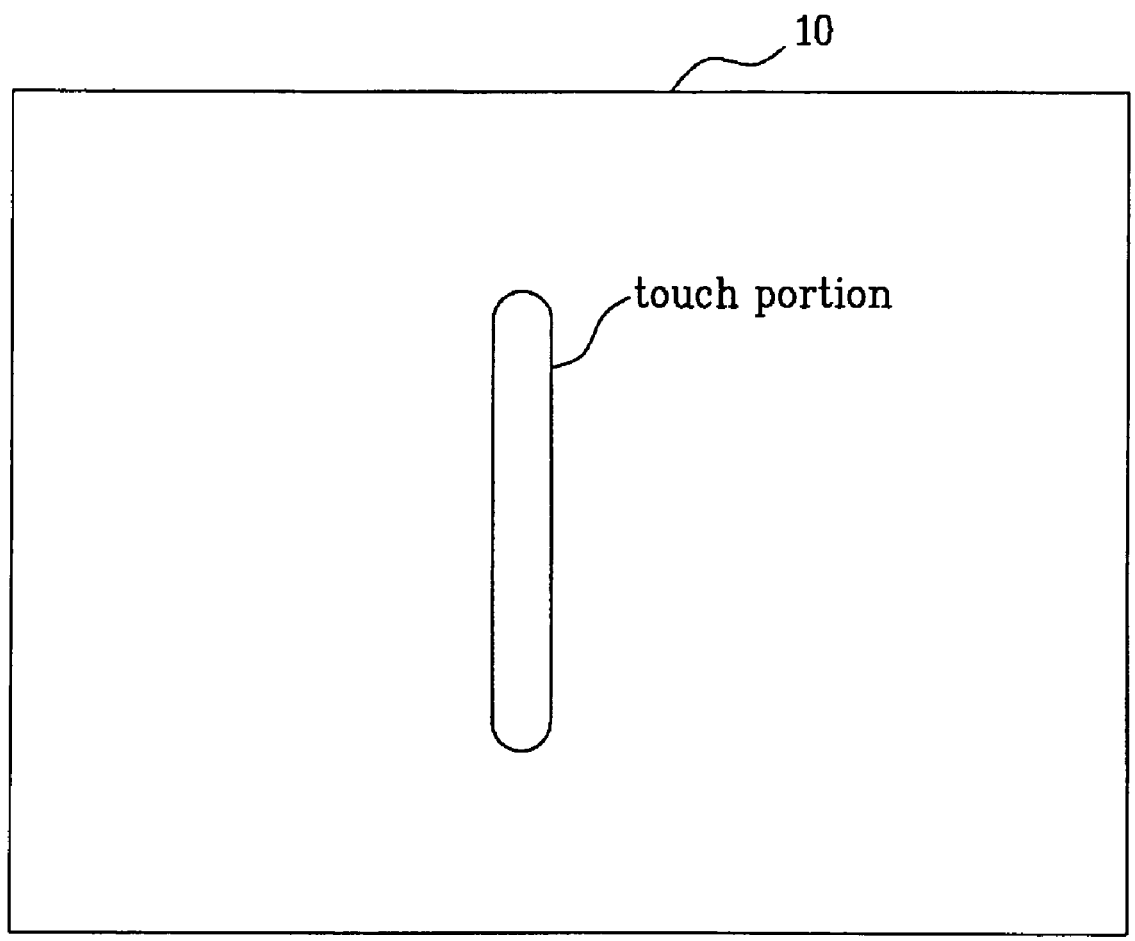
FIGS. 2A and 2B are a plan view, and a cross-sectional view illustrating a touch defect on the liquid crystal display device comprising the column spacer, respectively.
Figure 2B:
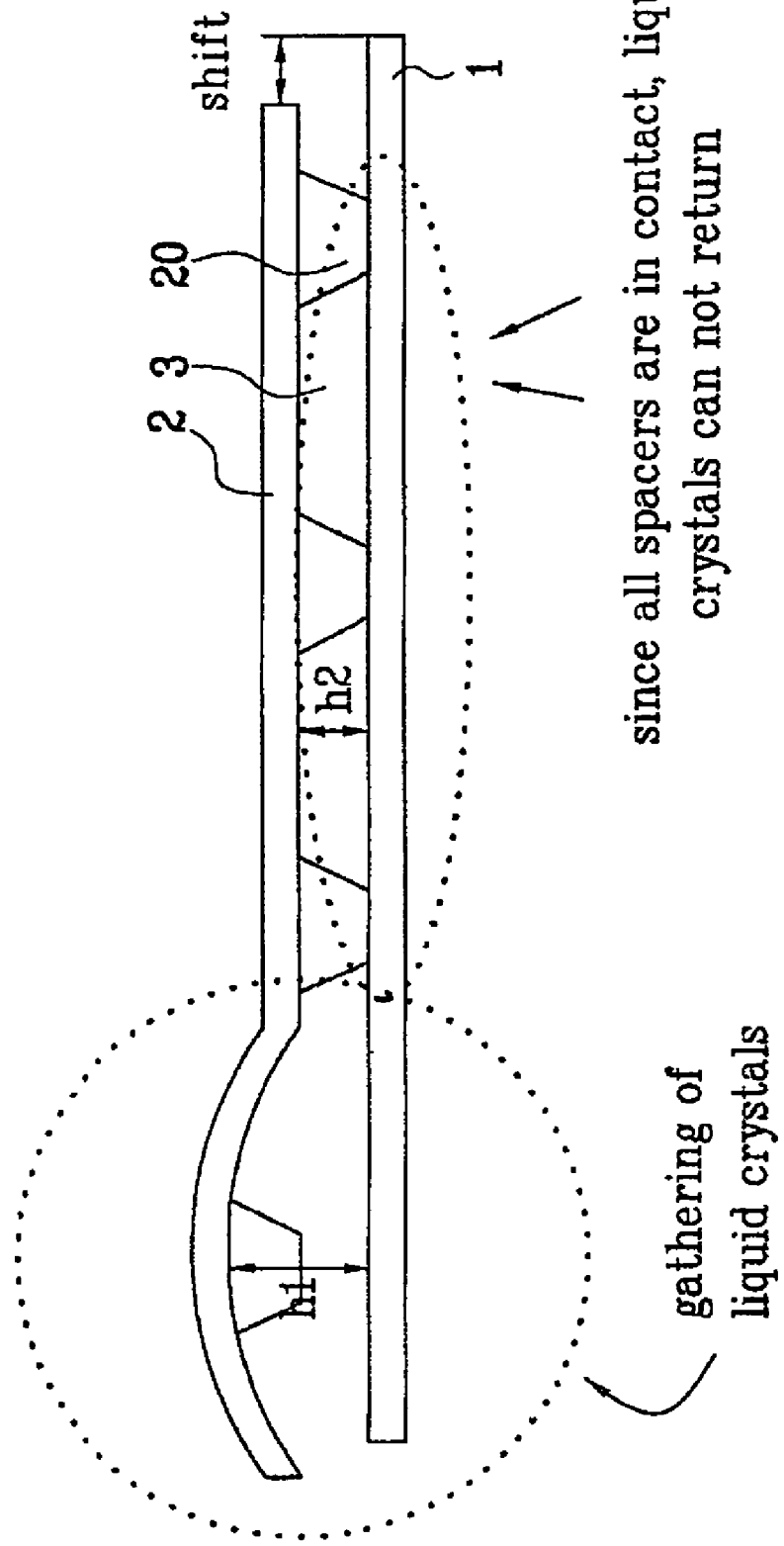
Figure 3:
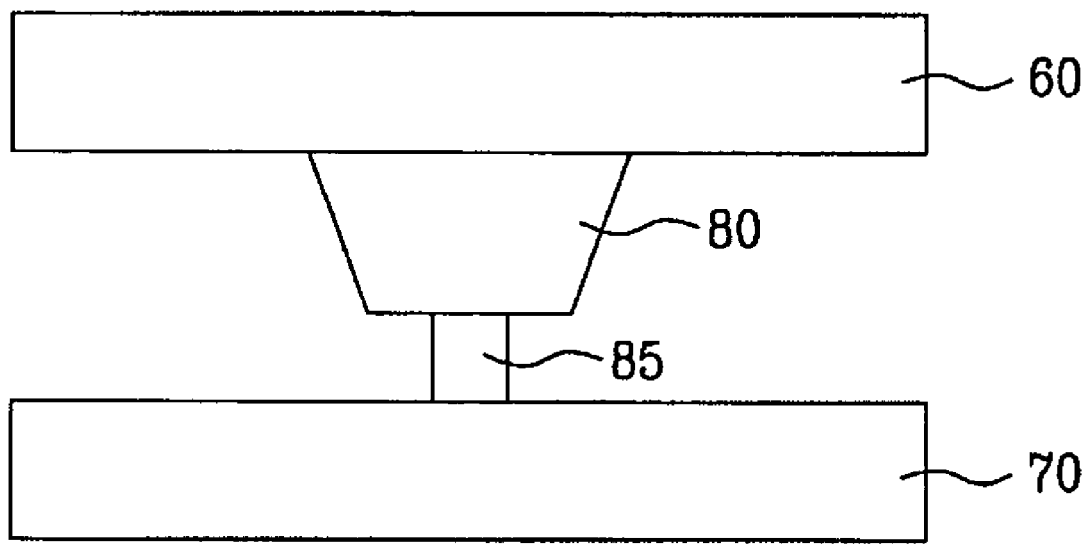
FIG. 3 is a schematic view illustrating the structure of a protrusion in a liquid crystal display device in accordance with the present invention.

FIG. 3 is a schematic view illustrating the structure of a protrusion in a liquid crystal display device in accordance with the present invention.

Referring to FIG. 3, the liquid crystal display device comprises first and second substrates 70 and 60 facing each other, a column spacer 80 formed at a predetermined portion on the second substrate 60, a protrusion 85 formed on the first substrate 70 to partially contact the column spacer 80 and having a smaller area than an upper surface (namely, an end portion) of the column spacer 80 (that is, a corresponding surface of the column spacer 80 with respect to the protrusion), and a liquid crystal layer (not shown) interposed between the first and second substrates 70 and 60.

As such, if the liquid crystal display device comprises the protrusion 85, and when an operator touches a surface of the first substrate 70 or the second substrate 60 (with a behavior of rubbing in one direction), causing one of the first and the second substrates 70 and 60 to be shifted with respect to the other, a contact area between the column spacer 80 and the protrusion 85 is defined to an upper surface (namely, an end portion) of the protrusion 85, which is smaller than an upper surface of the column spacer 80 (here, the "upper surface" is referred with reference to the second substrate 60 having the column spacer formed thereon, and thus, the surface of the column spacer 80 contacting the surface of the second substrate 60 is referred to as a "lower surface"), so that a frictional area between the column spacer 80 and the second substrate 60 is reduced in comparison to the conventional liquid crystal display device, thereby reducing frictional force therebetween. Accordingly, when the first substrate 70 or the second substrate 60 is shifted in one direction by touch, the touched substrate can be easily recovered to an original state.

For the liquid crystal display device comprising such a protrusion, when the first and second substrates 70 and 60 are assembled, the shape of the column spacer 80 corresponding to the protrusion 85 is changed as follows. First, force is concentrated on a portion of the column spacer 80 corresponding to the protrusion 85, so that a color filter layer (not shown) and a black matrix layer (not shown) under the column spacer 80 are pushed down together.

As such, if a single layer or a plurality of layers are compressed, when a liquid crystal panel is brought into a high temperature condition, causing a cell gap to be enlarged via thermal expansion of liquid crystals, the column spacer 80 can be recovered to the original state by a compressed degree of the column spacer 80 and the layers under the column spacer 80, and maintain the space between the first and second substrates 70 and 60, thereby preventing gravity defect caused by drooping of the liquid crystals in comparison to the structure not having the protrusion.

However, in the case where a protrusion having smaller volume and surface area is formed corresponding to the center of the column spacer configured as described above, and when the column spacer and the underlayer thereof are compressed by the protrusion, the force can be concentrated, particularly, on the portion of the column spacer 80 corresponding to the protrusion 85. On this condition, if the first and second substrates 70 and 60 are excessively compressed by external force (that is, possibly causing compression force from a rear side of one of the first and second substrates to become excessive), there occurs a phenomenon wherein the column spacer 80 is compressed by the protrusion 85, and is not recovered to the original state.

Such a compressing behavior can be conducted by a separate compression test before launching the liquid crystal display device, or during an assembly process for assembling liquid crystal modules.

Figure 4:
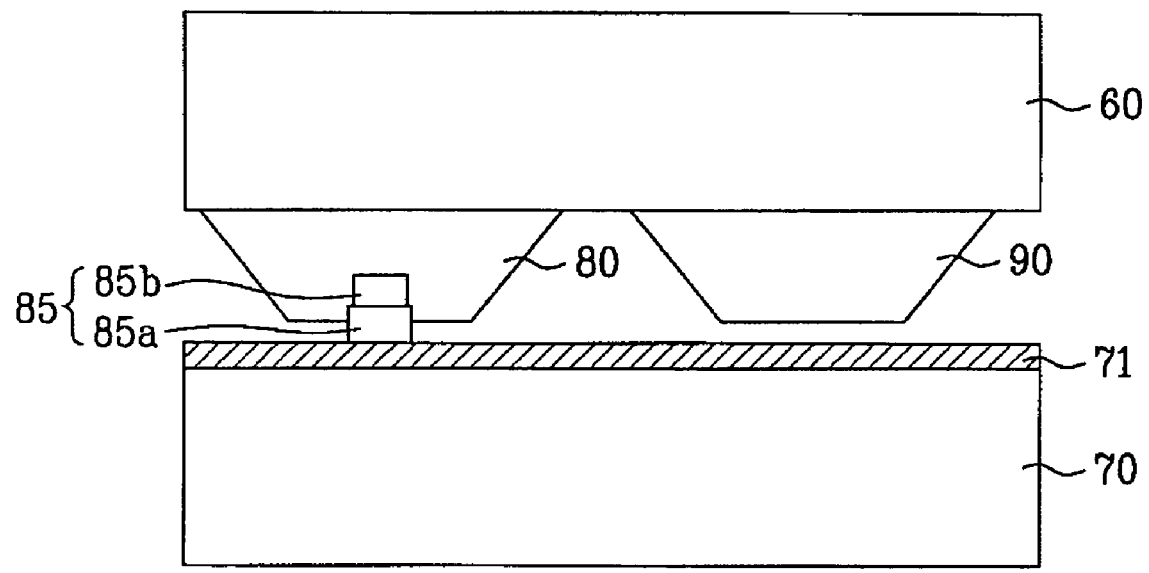
FIG. 4 is a cross-sectional view illustrating the liquid crystal display device comprising the protrusion shown in FIG. 3 with first and second substrates assembled.
Figure 5A:
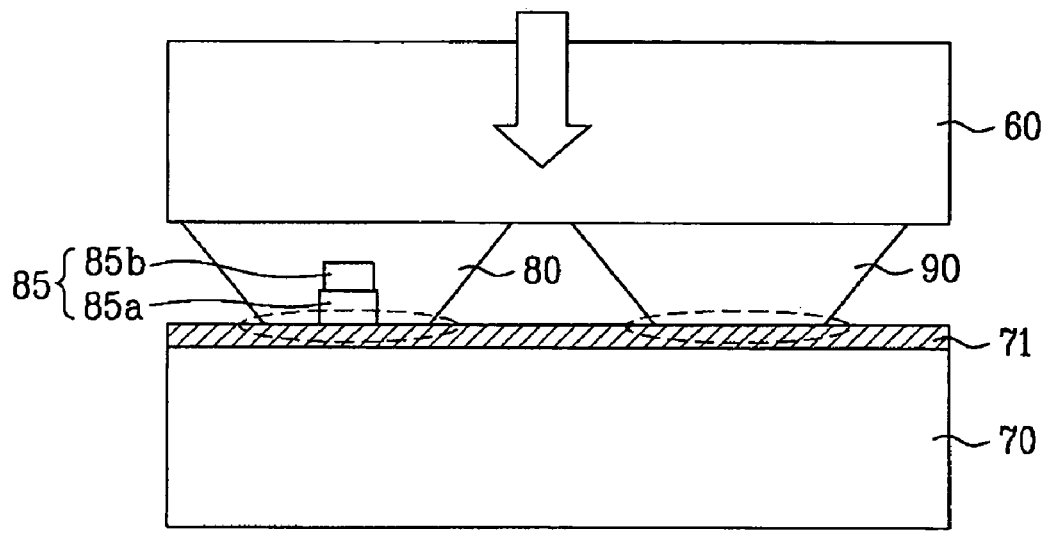
FIGS. 5A and 5B are cross-sectional views illustrating a contact degree between a column spacer and a substrate facing each other, and deformation of the column spacer according to a degree of external force applied to the liquid crystal display device shown in FIG. 4.
Figure 5B:
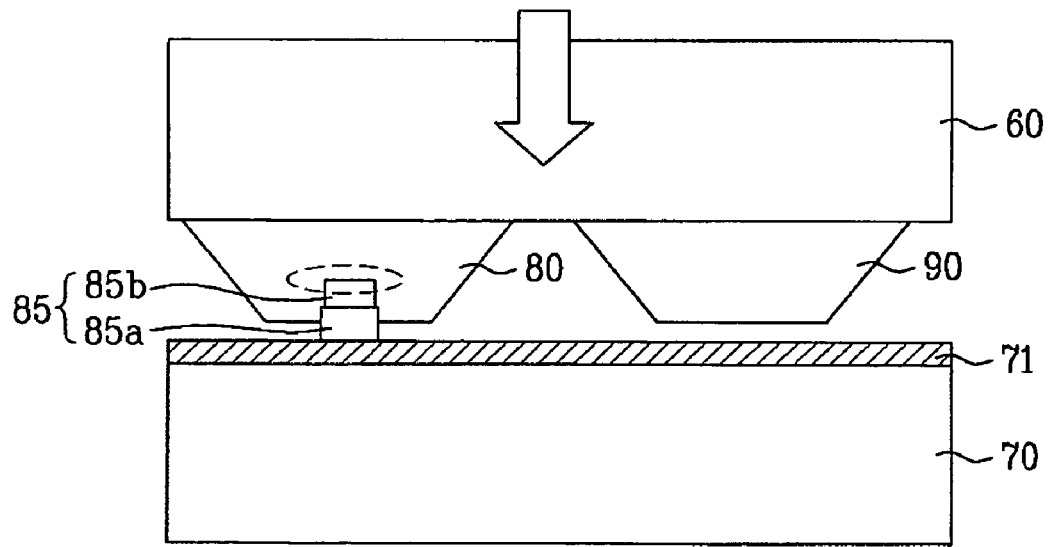

FIG. 4 is a cross-sectional view illustrating the liquid crystal display device comprising the protrusion shown in FIG. 3 with first and second substrates assembled. FIGS. 5A and 5B are cross-sectional views illustrating a contact degree between a column spacer and a substrate facing each other, and deformation of the column spacer according to a degree of external force applied to the liquid crystal display device shown in FIG. 4.

As shown in FIG. 4, for the liquid crystal display device comprising the protrusion between the column spacer and the opposite substrate, at an initial stage of assembling the first and second substrates, a first column spacer 80 is brought into contact with the protrusion 85, and a second column spacer 90 is separated from the first substrate 70. Accordingly, when touch operation is performed in such a way of rubbing a rear side of the first substrate 70 or the second substrate 60 with a slight force, only an upper surface of the protrusion 85 remains in contact with the first column spacer 80. Thus, since recovery of the touched portion to an original state is performed rapidly due to a small contact area after shifting of one of the first and second substrates 70 and 60 with respect to the other, a touch defect is not observed.

The protrusion 85 is formed by stacking a semiconductor layer pattern 85a at a lower portion of the protrusion, and a metal layer 85b at an upper portion thereof. The protrusion 85 is formed on a gate line 71 or a common line (not shown) on the first substrate 70. Alternatively, the protrusion 85 is formed on a metal component coplanar with the gate line or the common line.

For the liquid crystal display device comprising the protrusion described above, if the protrusion 85 is excessively compressed by external force as shown in FIG. 5A, the protrusion 85 is crushed by the first column spacer 80, as shown in FIGS. 5A and 5B. In severe cases, both first and second column spacers 80 and 90 are brought into contact with the first substrate 70, as shown in FIG. 5A.

If the compression force is less than the case of FIG. 5A, but greater than the pressure applied between the first and second substrates 70 and 60 when assembling the first and second substrates 70 and 60, the first column spacer 80 remains in the state of being crushed by the protrusion 85.

In this case, if the compression force applied particularly to the first column spacer 80 corresponding to the protrusion 85 is a predetermined pressure or more, the first column spacer 80 is subjected to plastic deformation (crushed by the protrusion), and cannot be recovered to the original state.

In particular, since the protrusion 85 is formed of a double layer formed by stacking the semiconductor layer pattern 85a and the source/drain metal layer 85b, it has a thickness depending on the thickness of the material layers (the semiconductor layer pattern and the source/drain metal layer). In this case, an increase in thickness of the semiconductor layer pattern 85a and the source/drain metal layer 85b causes an increase in separation between the first and second column spacers 80 and 90 and the first substrate 70.

Accordingly, there is a high possibility of causing the first column spacer 80 to be subjected to the plastic deformation by the protrusion 85 depending on making the protrusion thicker until the second column spacer 90 is, brought into contact with the first substrate 70 by continuous external force after the first column spacer 80 is brought into contact with the protrusion 85. As such, if the first column spacer 80 is subjected to the plastic deformation, a deformed portion of the first column spacer is not recovered to the original state, and remains in the crushed state even after the external force is removed. Thus, this portion is observed as a black spot due to deformation. Such a spot is referred to as a stamp spot, and once the stamp spot is created, it is impossible for the deformed portion to recover the original state.

According to designs of the liquid crystal display device, the thickness of the semiconductor layer pattern 85a and the source/drain metal layer 85b can be changed. Particularly, the stamp spot becomes problematic for the design of the LCD device in which the semiconductor layer pattern 85a and the source/drain metal layer 85b are thick.

Specifically, for such an LCD device, at an initial stage of assembling the first and second substrates, the first column spacer 80 is brought into contact with the protrusion 85, while the second column spacer 90 is separated from the first substrate 70 by a thickness of the protrusion 85. Thus, in order to make the second column spacer 90 to contact the first substrate 70, it is necessary to compress the second column spacer 90 by the thickness of the protrusion 85 with application of external force. At this time, the first and second column spacers 80 and 90 serve to disperse and take their own share of a contact pressure when the second column spacer 90 is brought into contact with the first substrate 70. However, if the first column spacer 80 is plastically deformed, it is impossible for the first column spacer 80 to recover the original state.

A liquid crystal display device having a compensation pattern for preventing compression of the second column spacer on the first substrate corresponding to the second column spacer, and a method for manufacturing the same will be described hereinafter.

Meanwhile, external force causing deformation of the column spacer is provided in consideration of all cases where the external force can be applied, for example, when determining whether the stamp spot is created on the liquid crystal panel by application of an intended pressure such as a compression test or when the liquid crystal panel is partially compressed during a module process.

Figure 6:
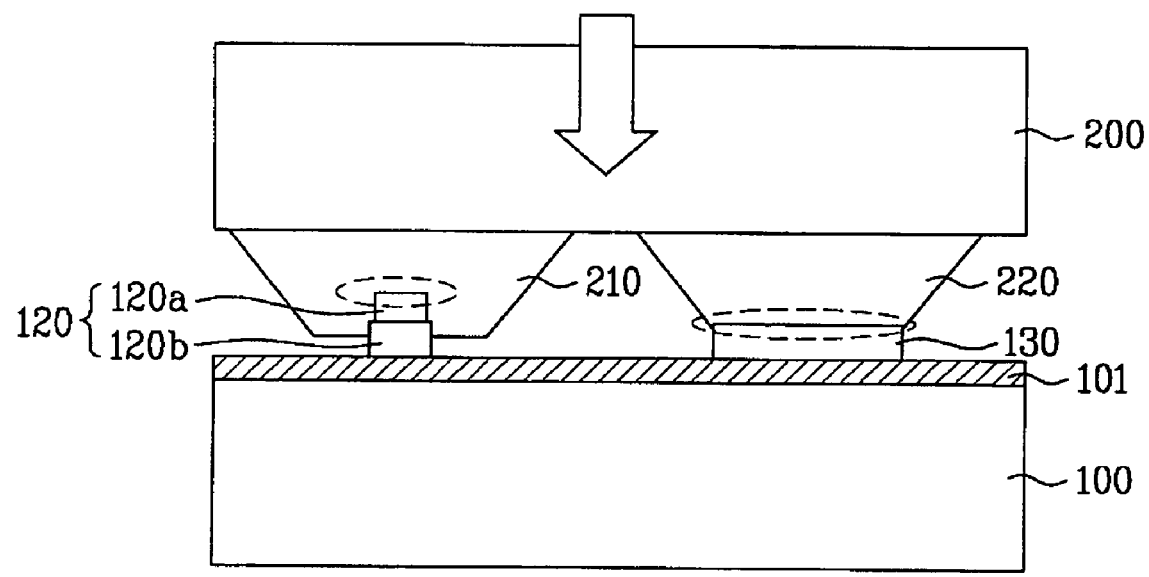
FIG. 6 is a cross-sectional view illustrating a contact degree between the column spacer and the substrate facing each other, and deformation of the column spacer according to the degree of external force applied to a liquid crystal display device in accordance with the present invention.

FIG. 6 is a cross-sectional view illustrating a contact degree between a column spacer and a substrate facing each other in the liquid crystal display device according to the present invention, and deformation of the column spacer at that time.

As shown in FIG. 6, the liquid crystal display device of the present invention comprises a first substrate 100 and a second substrate 200 facing each other, a liquid crystal layer 250 (see FIG. 8) disposed between the first and second substrates 100 and 200, a gate line 101 formed on the first substrate 100, a protrusion 120 and a compensation pattern 130 formed at predetermined portions on the gate line 101 of the first substrate 100, a first column spacer 210 corresponding to the protrusion 120, and a second column spacer 220 corresponding to the compensation pattern 130.

The protrusion 120 is formed by stacking a semiconductor layer pattern 120b formed at a lower portion of the protrusion, and a metal layer 120a formed at an upper portion thereof. The compensation pattern 130 is formed of a single semiconductor pattern layer.

In this structure, with a predetermined pressure due to compression, the second column spacer 220 can be brought into contact with the compensation pattern 130 until the first column spacer 210 is subjected to plastic deformation, by which the first column spacer 210 cannot recover its own original state, after the first column spacer 210 is partially compressed by the protrusion 120. As such, the first and second column spacers 210 and 220 corresponding to the protrusion 120 and the compensation pattern 130 can share the pressure due to the compression, thereby preventing the first column spacer 210 from being crushed. Accordingly, there is no plastic deformation in the first column spacer so that a stamp spot is prevented from being created.

Figure 7:
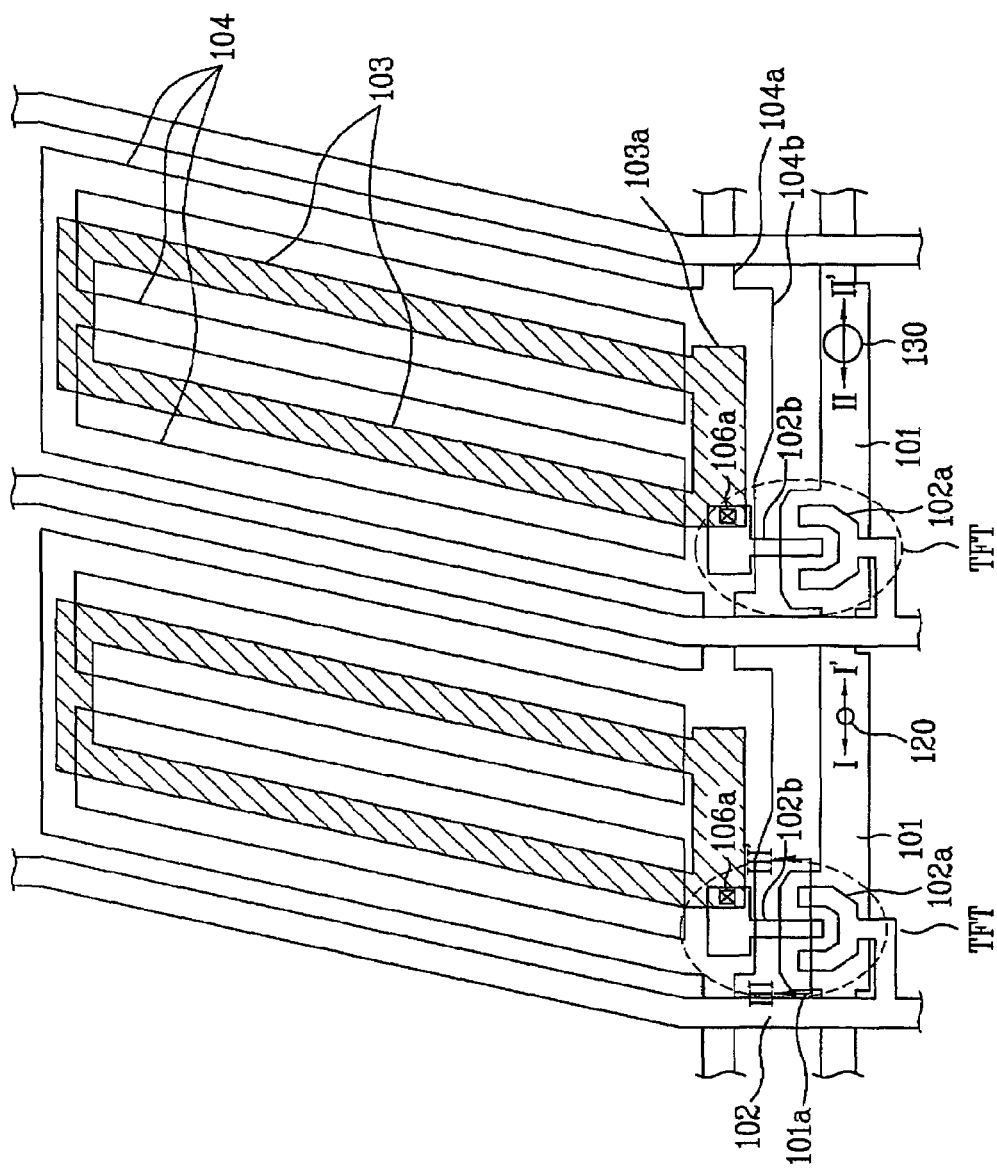
FIG. 7 is a plan view illustrating the liquid crystal display device in accordance with the present invention.
Figure 8:
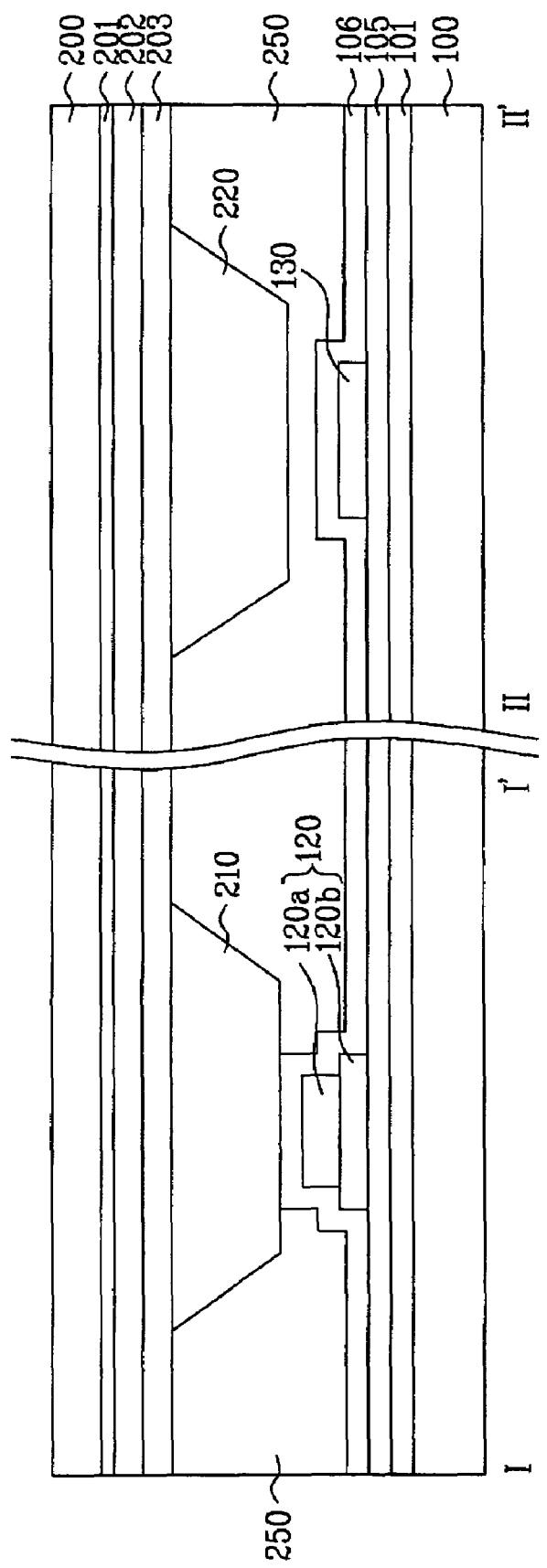
FIG. 8 is a cross-sectional view taken along lines II-I' and II-II' of FIG. 7.

FIG. 7 is a plan view illustrating the liquid crystal display device in accordance with the present invention, and FIG. 8 is a cross-sectional view taken along lines I-I' and II-II' of FIG. 7.

As shown in FIGS. 7 and 8, for the LCD device of the present invention, the first substrate 100 is formed thereon with gate lines 101 and data lines 102 crossing each other to define pixel regions, a thin film transistor (TFT) at each crossing portion of the gate lines 101 and the data lines 102, a first storage electrode 103a electrically connected with a drain electrode 102b of each thin film transistor, a pixel electrode 103 branched from the first storage electrode 103a, a common line 104a parallelly adjacent to both consecutive gate lines in each pixel region, a common electrode 104 branched from the common line 104a to alternate with the pixel electrode 103, and a second storage electrode 104b connected with the common electrode 104 while overlapping with the first storage electrode 103a.

Here, the thin film transistor has a channel region defined between a U-shaped source electrode 102a and the drain electrode 102b. Thus, the channel region is also defined in a U shape corresponding to an inner shape of the source electrode 102a. The thin film transistor comprises a gate electrode 101a protruding from the gate line 101, the U-shaped source electrode 102a protruding from the data line 102, and the drain electrode 102b separated a predetermined distance from the source electrode 102b while inserting inside the U shape of the source electrode 102a. In addition, the thin film transistor further comprises a semiconductor layer (not shown) under the data line 102, source electrode 102a, drain electrode 102b, and the channel region between the source electrode 102a and the drain electrode 102b.

Here, the semiconductor layer is formed by stacking a non-crystalline silicon layer (not shown) and then an n+ layer (impurity layer) (not shown) on the silicon layer, and removing a portion of the n+ layer (impurity layer) in the channel region between the source electrode 102a and the drain electrode 102b. The semiconductor layer may be selectively formed only under the source/drain electrodes 102a and 102b, and the channel region therebetween. Alternatively, the semiconductor layer may be formed under the data line 102, the source electrode 102a, and the drain electrode 102b as well as channel region. Meanwhile, although the liquid crystal display device is illustrated as comprising the U-shaped source electrode 102a and the U-shaped channel in the drawings, the liquid crystal display device may have the source electrode 102a having a "-" shape protruding from the data line 102 or in other shapes.

Here, the gate line 101, the common line 104a and the common electrode 104 are formed of the same material on the same layer.

In addition, a gate insulation layer 105 is interposed between the gate line 101 and the semiconductor layer, and a passivation layer 106 is interposed between the data line 102 and the pixel electrode 103.

Meanwhile, the second storage electrode 104b is connected with the common line 104a passing through the pixel region, the first storage electrode 103a overlapped on the second storage electrode 104b, and the gate insulation layer 105 and the passivation layer 106 interposed between these two electrodes constitute a storage capacitor.

Here, the drain electrode 102b and the first storage electrode 103a formed on different layers are brought into contact with each other via a contact hole 106a which is formed by removing the passivation layer 106 at a predetermined portion on the drain electrode 102b.

In addition, a protrusion 120 is formed at a predetermined portion on the gate line 101 or the common line 104a, and comprises a semiconductor layer pattern 120b on the same layer as that of the semiconductor layer 107a, and a source/drain metal layer 120a on the same layer as that of the source/drain electrodes 102a/102b, which are stacked in this order.

The semiconductor pattern 120b has a thickness of about 0.2~0.3 μm, and the source/drain metal layer 120a has a thickness of about 0.2~0.4 μm. Unlike a remaining portion where the protrusion 120 is not formed, the portion having the protrusion 120 formed thereon is formed as a step of about 0.4~0.7 μm. In the liquid crystal display device comprising the protrusion 120, the protrusion 120 becomes to face the first column spacer 210 formed on the second substrate 200 when the first and second substrates 100 and 200 are assembled to form a cell gap therebetween. At this time, an upper surface (namely, an end portion) of the protrusion 120 is smaller than an upper surface of the first column spacer 210 (in this case, it is assumed that a surface of the first column spacer 210 brought into contact with the second substrate 200 is a lower surface), so that the first column spacer 210 is brought into contact with the protrusion 120 across the upper surface of the protrusion 120 when the first column spacer 210 is brought into contact with the protrusion 120.

Here, since the protrusion 120 is formed with the passivation layer 106 on a remaining region of the protrusion excluding the contact hole 106a, a contact portion with the column spacer 210 formed on the second substrate 200 is defined in the passivation layer 106 on the protrusion 120.

In addition, a compensation pattern 130 is formed at a predetermined portion on the gate line 101 where the protrusion 120 is not formed. The compensation pattern 130 is formed on the same layer as that of the semiconductor pattern 120b, and has a lower height than that of the protrusion 120.

Although the protrusion 120 and the compensation pattern 130 are illustrated as being formed on the gate line 101 in the drawings, the protrusion 120 and the compensation pattern 130 may be formed on the common line 104a. Alternatively, the protrusion 120 and the compensation pattern 130 may be formed on the second storage electrode 104b which is formed of the same metal as that of the gate line 101 and the common line 104a.

The second substrate 200 faces the first substrate 100, and is formed thereon with a black matrix layer 201 corresponding to the region (region of the gate line and the data line) excluding the pixel region, a color filter layer 202, and an overcoat layer 203 for flatness of the second substrate 200 comprising the black matrix layer 201 and the color filter layer 202.

In addition, the first column spacer 210 is formed on a portion of the overcoat layer 203 corresponding to the protrusion 120, and the second column spacer 220 is formed on a portion of the overcoat layer 203 corresponding to the compensation pattern 130.

Here, the first column spacer 210 and the second column spacer 220 have the same height on the overcoat layer 203. When the first column spacer 210 is brought into contact with the protrusion 120 upon assembly of the first and second substrate to form the cell gap, the second column spacer 220 remains in a state of being separated a predetermined distance from the first substrate 100, thereby reducing a ratio of contact area between the overall column spacers and the first substrate 100. Accordingly, touch is conducted in a state wherein the protrusion 120 is brought into contact with the first column spacer 210, and even when the first substrate 100 or the second substrate 200 is shifted in one direction by the touch, the touched substrate can be easily recovered to an original state due to a smaller contact area, thereby preventing non-uniform brightness due to the touch.

Upon a compression test with application of a predetermined pressure or more, initially, the first column spacer 210 is brought into contact with the protrusion 120, and as the pressure increases, the second column spacer 220 is then brought into contact with an upper surface (namely, an end portion) of the compensation pattern 130 of the first substrate 100, which corresponds to the second column spacer 220, so that a contact area therebetween increases, thereby dispersing the pressure upon the compression test. At this time, the compensation pattern 130 can slightly relieve the step difference with the protrusion 120, so that the second column spacer 220 is brought into contact with the upper surface of the first substrate 100 while the first column spacer 210 is deformed by the compression test. Then, the column spacers are brought into contact with the first substrate across a wider contact area from when the second column spacer 220 contacts the upper surface of the first substrate 100.

Accordingly, while the first column spacer 210 contacts the protrusion 120, the pressure is concentrated on the first column spacer 210 via the protrusion 120 so that, even when the first column spacer 210 deforms, the second column spacer 220 is brought into contact with the first substrate 100 before severe deformation of the second column spacer 220 occurs (that is, before recovery of the second column spacer 220 into the original state becomes impossible), thereby enabling the column spacers 210 and 220 to recover the original state after the compression test.

Meanwhile, the first and second column spacers 210 and 220 may have various shapes, including a circular shape, a rectangular shape, and other polygonal shapes in a transverse cross-section. Advantageously, the first and second column spacers 210 and 220 may have the circular shape or a regular polygonal shape in view of an alignment margin upon a process.

The protrusion 120 and the compensation pattern 130 may also have various shapes, including a circular shape, a rectangular shape, and other polygonal shapes in a transverse cross-section. In this case, the transverse cross-section of the protrusion 120 is formed as small as possible in a pattern which can minimize a contact area upon touch. The compensation pattern 130 serves to disperse contact pressure by increasing the contact area at a predetermined pressure or more, and has at least an area greater than or equal to the area of the protrusion 120. Advantageously, the compensation pattern 130 has an area greater than or equal to the upper surface of the second column spacer 220 in view of dispersion of the pressure upon compression.

Meanwhile, the compensation pattern 130 is formed on the same layer as that of the semiconductor layer (not shown) formed under the source/drain electrodes 102a/102b of the thin film transistor. In a 5 mask process, the compensation pattern 130 is formed at the same time with a process of patterning the semiconductor layer, and in a 4 mask process, the compensation pattern 130 is formed at the same time with a process of patterning the source/drain electrode material layer and the semiconductor material layer.

More specifically, in the 5 mask process, the semiconductor layer is formed of the semiconductor material layer along with the compensation pattern 130 by patterning while the semiconductor pattern is formed as the lower layer of the protrusion 120. In this case, the semiconductor layer of the thin film transistor, the semiconductor layer pattern 120a as the lower layer of the protrusion, and the corresponding portion of the compensation pattern 130 are defined as a light shielding part or a transmission part of the mask for patterning (if a photosensitive film formed on the semiconductor material layer for patterning is a positive photosensitive material, it is defined as the light shielding part, and if the photosensitive film is a negative photosensitive material, it is defined as the transmission part).

In the 4 mask process, the semiconductor material layer, and the source/drain electrode material layer are formed in a predetermined pattern via a single diffraction exposure mask. In this case, a portion for the channel region of the thin film transistor, and a portion for the compensation pattern 130 are defined as a translucent part. A portion for the data line 102, a portion for the source/drain electrodes 102a/102b, and a portion for the protrusion 120 are defined as the light shielding part or the transmission part (if a photosensitive film formed on the source/drain electrode material layer for patterning is the positive photosensitive material, it is defined as the light shielding part, and if the photosensitive film is the negative photosensitive material, it is defined as the transmission part).

Meanwhile, in the 4 mask process, a diffraction exposure mask for patterning the semiconductor material layer and the source/drain electrode material layer is formed with a plurality of linear slits at a portion of the translucent part corresponding to the channel region, and a plurality of concentrically circular slits having different sizes at a portion of the translucent part corresponding to the compensation pattern 130. It is to use a diffraction exposure mask having the linear slits at a portion of the translucent part corresponding to the compensation pattern 130.

The diffraction exposure mask have a plurality of slits on the translucent part corresponding to the portion for the compensation pattern and the portion for the channel region. A width of each slit and a distance between the slits can be adjusted to obtain a resolution degree greater than which can be realized by a combination of an exposure device and the photosensitive film and to perform exposure uniformly.

Although the above embodiments have been described in view of the IPS mode liquid crystal display device, the present invention is applicable to the TN mode liquid crystal display device. The TN mode liquid crystal display device of the present invention is similar to the IPS mode liquid crystal display device described above, except that the pixel electrode is formed in a single pattern on the pixel region of the first substrate, and the common electrode is formed on the entire surface of the second substrate. For the TN mode liquid crystal display device, since the common line is not formed in the pixel region, the first and second column spacers, and the protrusion are formed on the gate line.

As apparent from the above description, the liquid crystal display device and the method for manufacturing the same according to the invention have advantageous effects as follows.

First, the protrusion is brought into contact with the first column spacer having a wider corresponding area than an upper surface of the protrusion when assembling the first and second substrates to form the cell gap, so that a significantly small contact area is created between all column spacers and the corresponding substrate (first substrate) by touch, thereby enabling easy recovery of the touched substrate into an original state after being shifted by the touch.

Second, when forming the data line, the protrusion, and the like, the compensation pattern is formed lower than the protrusion so that, when assembling the first and second substrate to form the cell gap therebetween, the first column spacer is brought into contact with the protrusion, and then, as the pressure increases upon the compression test, the second column spacer is brought into contact with the compensation pattern, thereby gradually increasing a contact area with the compensation pattern from an upper surface thereof. With this structure, the LCD device of the present invention has an advantageous effect in that the pressure is not concentrated on a specific portion, but dispersed upon the compression test. Accordingly, the pattern including the column spacers are not crushed by compression, thereby preventing the stamp spot (compression spot) and the like from being created.

Third, the first column spacer is compressed to a predetermined depth by the protrusion after the first column spacer contacts with the protrusion. In this case, when liquid crystal is expanded under a high temperature condition, the protrusion is recovered into an original state by the elasticity of the first column spacer. At this time, the first column spacer remains in contact with the protrusion continuously, thereby preventing liquid crystals from flowing down to a lower end of a liquid crystal panel near the ground. Accordingly, it is possible to relieve gravity defect.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device, comprising:
first and second substrates that face each other;
a plurality of first column spacers and a plurality of second column spacers formed on the second substrate;
a plurality of gate lines on the first substrate;
a plurality of data lines formed vertically with respect to the gate lines; and
a plurality of thin film transistors formed adjacent to each crossing portion of the gate lines and the data lines;
a plurality of protrusions formed at a predetermined portion on the first substrate, wherein the protrusions comprise an upper layer being on the same layer with source/drain electrodes of the thin film transistors and a lower layer being on the same layer with a semiconductor layer of the thin film transistors; and
a plurality of compensation patterns formed at another predetermined portion on the first substrate;
wherein an end portion of the first column spacer has a wider area than an end portion of the protrusion and an end portion of the compensation pattern has a wider area than the end portion of the protrusion.

2. The liquid crystal display device according to claim 1, wherein the compensation patterns are formed at a portion where the protrusions are not formed.

3. The liquid crystal display device according to claim 1, wherein the end portions of the first column spacers face the end portions of the protrusions with each other.

4. The liquid crystal display device according to claim 1, wherein the end portions of the second column spacers face the end portions of the compensation pattern with each other.

5. The liquid crystal display device according to claim 4, wherein the end portion of the second column spacer has a smaller area than or an equal area to the end portion of the compensation pattern.

6. The liquid crystal display device according to claim 1, wherein the compensation pattern has a lower height than the protrusions.

7. The liquid crystal display device according to claim 1, wherein the thin film transistor comprises:
a gate electrode that protrudes from the gate line;
the source electrode that protrudes from the data line;
the drain electrode separated from the source electrode; and
the semiconductor layer that partially overlaps with the source/drain electrodes between the gate electrode and source/drain electrodes.

8. The liquid crystal display device according to claim 7, wherein the compensation pattern is on the same layer with the semiconductor layer.

9. The liquid crystal display device according to claim 1, wherein the lower layer has a thickness of about 0.2-0.3 µm, and the upper layer has a thickness of about 0.2-0.4 µm.

10. The liquid crystal display device according to claim 1, wherein the first column spacer and the second column spacer have various shapes, including a circular shape, a rectangular shape, or other polygonal shapes in a transverse cross-section.

11. The liquid crystal display device according to claim 1, wherein the protrusion and the compensation pattern have various shapes, including a circular shape, a rectangular shape, or other polygonal shapes in a transverse cross-section.

12. The liquid crystal display device according to claim 1, further comprising a passivation layer interposed between the column spacers and the protrusions or compensation patterns.

13. A method for manufacturing a liquid crystal display device, comprising:
arranging a first substrate and a second substrate to face each other;
forming a plurality of first lines, a plurality of second lines formed vertically with respect to the first line, and a plurality of thin film transistors formed adjacent to each crossing portion of the first and second lines on the first substrate;
forming a protrusion at a predetermined portion on the first lines, wherein the protrusion comprises an upper layer being on the same layer with source/drain electrodes of the thin film transistors and a lower layer being on the same layer with a semiconductor layer of the thin film transistors;
forming a first column spacer on the second substrate so as to correspond to the protrusion and having a corresponding surface with respect to the protrusion, the corresponding surface being wider than the protrusion;
forming a compensation pattern at another predetermined portion on the first line where the protrusion is not formed, and having a lower height than the protrusion;
forming a second column spacer corresponding to the compensation pattern; and
forming a liquid crystal layer between the first and second substrates; and
wherein the compensation pattern has an upper surface wider than an upper surface of the protrusion.

14. The method for manufacturing a liquid crystal display device according to claim 13, wherein the first line is a gate line or a common line, and the second line is a data line.

15. The method for manufacturing a liquid crystal display device according to claim 14, wherein the thin film transistor comprises:
a gate electrode that protrudes from the gate line;
the source electrode that protrudes from the data line;
the drain electrode separated from the source electrode while being formed on the same layer as that of the source electrode; and
the semiconductor layer that partially overlaps with the source/drain electrodes above the gate electrode.

16. The method for manufacturing a liquid crystal display device according to claim 15, wherein the compensation pattern is on the same layer with the semiconductor layer.

17. The method for manufacturing a liquid crystal display device according to claim 13, wherein the lower layer has a thickness of about 0.2-0.3 μm, and the upper layer has a thickness of about 0.2-0.4 μm.

18. The method for manufacturing a liquid crystal display device according to claim 13, wherein the first column spacer and the second column spacer have the same height.

19. The method for manufacturing a liquid crystal display device according to claim 13, wherein the first column spacer and the second column spacer have various shapes, including a circular shape, a rectangular shape, or other polygonal shapes in a transverse cross-section.

20. The method for manufacturing a liquid crystal display device according to claim 13, wherein the protrusion and the compensation pattern have various shapes, including a circular shape, a rectangular shape, or other polygonal shapes in a transverse cross-section.

21. A method for manufacturing a liquid crystal display device, comprising:
preparing first and second substrates;
forming a plurality of first column spacers and second column spacers on the second substrate;
forming a plurality of thin film transistors on the first substrate;
forming a plurality of protrusions at a predetermined portion on the first substrate, wherein the protrusion comprises an upper layer being on the same layer with source/drain electrodes of the thin film transistors and a lower layer being on the same layer with a semiconductor layer of the thin film transistors; and
forming a plurality of compensation patterns at another predetermined portion on the first substrate;
wherein an end portion of the first column spacer has a greater area than an end portion of the protrusion and an end portion of the compensation pattern has a wider area than the end portion of the protrusion.

22. The method according to claim 21, wherein the step of preparing the first substrate comprises the steps of:
forming a first line on the first substrate;
sequentially forming an insulation film, the semiconductor material layer, and the source/drain electrode material layer over the first substrate;
forming a photosensitive pattern that has a first thickness in corresponding to the first column spacers and a second thickness in corresponding to the second column spacers;
selectively etching the source/drain electrode material layer and the semiconductor material layer using the photosensitive patterns to form a protrusion and a compensation pattern.

23. The method according to claim 22, wherein the second thickness of the photosensitive pattern is lower than the first thickness of the photosensitive pattern.

24. The method according to claim 23, wherein the protrusion is formed in the region where the photosensitive pattern with the first thickness is located, and the compensation pattern is formed in the region where the photosensitive pattern with the second thickness is located.

25. The method according to claim 22, wherein the compensation pattern has a lower height than the protrusion.

26. The method according to claim 22, wherein the photosensitive pattern is formed using a diffraction exposure mask.

27. The method according to claim 26, wherein a portion of the diffraction exposure mask corresponding to the first thickness of the photosensitive pattern is a light shield portion, and a portion of the diffraction exposure mask corresponding to the second thickness of the photosensitive pattern is a translucent portion that comprises a plurality of slits.

28. The method according to claim 27, wherein the photosensitive pattern is formed of a positive photosensitive material.

29. The method according to claim 26, wherein a portion of the diffraction exposure mask corresponding to the first thickness of the photosensitive pattern is a transmission portion, and a portion of the diffraction exposure mask corresponding to the second thickness of the photosensitive pattern is a translucent portion that comprises a plurality of slits.

30. The method according to claim 29, wherein the photosensitive pattern is formed of a negative photosensitive material.

31. The method according to claim 27 or 29, wherein the slits comprise concentrically circular slits.

32. The method according to claim 22, wherein an end portion of the second column spacer has a smaller area than or an equal to an end portion of the compensation pattern.

33. The method according to claim 22, further comprising forming a second line vertically with the first line, source/drain electrodes in the same layer as the second line, and the semiconductor layer comprising a channel region positioned between the source electrode and drain electrode.

34. The method according to claim 33, wherein the photosensitive pattern has the first thickness in corresponding to the source and drain electrodes and the second thickness in corresponding to the channel region.

35. The method according to claim 21, wherein the lower layer has a thickness of about 0.2-0.3 μm, and the upper layer has a thickness of about 0.2-0.4 μm.

36. The method according to claim 21, wherein the compensation pattern is on the same layer with the semiconductor layer.

37. The method according to claim 21, wherein the first column spacer and the second column spacer have various shapes, including a circular shape, a rectangular shape, or other polygonal shapes in a transverse cross-section.

38. The method according to claim 21, wherein the protrusion and the compensation pattern have various shapes, including a circular shape, a rectangular shape, or other polygonal shapes in a transverse cross-section.

39. The liquid crystal display device according to claim 21, further comprising forming a passivation layer over the entire surface of the first substrate after forming the protrusions and the compensation patterns.

* * * * *